United States Patent [19]

Hart

[11] Patent Number: 5,296,132
[45] Date of Patent: Mar. 22, 1994

[54] HIGH TEMPERATURE HYDROCARBON DEFOAMER COMPOSITION AND METHOD

[75] Inventor: Paul R. Hart, The Woodlands, Tex.

[73] Assignee: Betz Laboratories, Inc., Trevose, Pa.

[21] Appl. No.: 957,327

[22] Filed: Oct. 6, 1992

[51] Int. Cl.$^5$ .................... C10G 9/14; C10B 57/12
[52] U.S. Cl. .................... 208/131; 252/321
[58] Field of Search .................... 252/321; 208/131

[56] References Cited

U.S. PATENT DOCUMENTS

| | | | |
|---|---|---|---|
| 2,373,951 | 4/1945 | Evans et al. | 252/321 |
| 2,762,780 | 9/1956 | Kulakow | 252/321 |
| 2,862,885 | 12/1958 | Nelson et al. | 252/49.6 |
| 3,652,453 | 3/1972 | MacDonnell | 252/358 |
| 4,451,390 | 5/1984 | Flannigan | 252/321 |
| 4,557,841 | 12/1985 | Arndt | 252/45 |
| 4,584,125 | 4/1986 | Griswold et al. | 252/321 |
| 4,612,109 | 9/1986 | Dillon et al. | 208/131 |
| 4,749,517 | 6/1988 | Chwang et al. | 252/52 A |
| 4,800,015 | 1/1989 | Simmons | 44/502 |
| 4,919,843 | 4/1990 | Innertsherger et al. | 252/321 |
| 4,961,840 | 10/1990 | Goyal | 208/131 |
| 4,969,988 | 11/1990 | Jain et al. | 208/131 |
| 5,008,039 | 4/1991 | Woodward et al. | 252/321 |

*Primary Examiner*—Jerry D. Johnson
*Attorney, Agent, or Firm*—Alexander D. Ricci; Philip H. Von Neida

[57] ABSTRACT

Methods and compositions for controlling foam in high temperature hydrocarbons during processing vegetable oils, exemplified by jojoba oil, are added to the hydrocarbon to control foam.

6 Claims, No Drawings

HIGH TEMPERATURE HYDROCARBON DEFOAMER COMPOSITION AND METHOD

FIELD OF THE INVENTION

The present invention pertains to compositions and methods for controlling foaming in hydrocarbon fluids undergoing high temperature processing.

BACKGROUND OF THE INVENTION

Foaming problems can occur during the high temperature processing of hydrocarbon fluids. Crude oil towers and cokers operating at high temperatures can produce foam in their hydrocarbon products which in turn diminishes the efficiency of the tower or coker, degrading the quality of the overhead products such as gasoline and gas oils. Severe foaming problems are often encountered in crude oils during separation of dissolved gases at the well-head.

In the processing of various residual petroleum stocks into coke, a commonly used technique is the well known delayed coking process. In the delayed coking process, heavy residual oils are heated to about 500° C. by pumping them at high velocity through a pipe furnace and then charging these oils to an insulated coking drum. The delayed coking process produces a quantity of foam which is undesirable since it diminishes the efficient operation of the process.

Other refinery processes that can experience foaming problems include crude units, vacuum units, vis breakers, delayed cokers and asphalt processing units. Traditionally, silicone (dimethyl polysiloxane) based antifoam compounds were employed to treat these operations for foaming problems.

The use of silicone-based defoaming compounds is economically attractive due to their low dosage levels in the hydrocarbons. However, they pose a problem in being expensive with respect to using them in less expensive hydrocarbon fluids. The silicone-based compounds also pose a problem due to their difficulty in dispersing in high temperature hydrocarbon systems. The silicone-based compounds tend to react with the metal surfaces of the processing system. Another problem that is significant to the oil industry is that silicone-based defoamers poison downstream catalysts with silicon carryover and residues.

SUMMARY OF THE INVENTION

This present invention relates to compositions and methods for controlling foaming in hydrocarbon fluids under-going high temperature processing employing a vegetable oil.

The preferred vegetable oil is jojoba oil which is a liquid wax ester mixture derived from shrub plants native to the Southwestern United States and Northern Mexico.

DESCRIPTION OF THE RELATED ART

U.S. Pat. No. 2,862,885, Nelson et al., teaches a hydrocarbon oil which contains a homopolymer of a monovinylalkoxysilane to inhibit foaming of the hydrocarbon oil. U.S. Pat. No. 3,652,453, MacDonnell, teaches a process for preparing a defoamer composition for hydrocarbon oil base systems. This composition comprises a quick-chilled mixture of hydrocarbon waxes and/or amides and organic polymers in an inert liquid vehicle. Additionally, castor oil, silicone oil, water, an alkylene oxide-castor oil reaction product, and a sulfonated naphthalene condensate may be added to the hydrocarbon oil.

DETAILED DESCRIPTION OF THE INVENTION

The present invention relates to compositions and methods for controlling foam in high temperature hydrocarbon fluids during processing comprising adding an effective amount of a vegetable oil.

The preferred vegetable oil is jojoba oil. This is a commercially available oil which can be purchased, for example, from Jojoba Growers and Processors, Inc. The jojoba oil in both pure and refined grades controlled foaming during laboratory testing.

"High temperature" is meant to include those hydrocarbons being processed at a temperature from about 300° F. to about 1000° F. Distillation of crude oils and coking of crude oils frequently occur at temperatures from 600° F. to 1000° F.

The vegetable oil may be added to the hydrocarbon fluid that is experiencing foaming problems in neat form, or in any suitable solvent. Representative solvents include naphtha, or any organic oil which is compatible with the hydrocarbon being treated.

The preferred embodiment of this invention is jojoba oil either in an unrefined (pure) form or diluted with organic solvent. One advantage of employing jojoba oil is its low viscosity which eliminates the need to dilute the oil, makes it easier to handle and allows its use with smaller pumps. These oils may also prove to be environmentally cleaner to produce than chemical based alternatives.

The vegetable oils can be applied at any stage of the hydrocarbon processing system experiencing foaming. It is preferred that the oils be applied either upstream of the site experiencing foaming problems or directly to the site of the problem.

The vegetable oils may be applied to the hydrocarbon being treated as solutions with concentrations ranging from 1% to 100% active with 10% to 100% being the preferred range. This would convert into a dosage rate of 10 parts to about 1000 parts per million parts hydrocarbon. Specific dosages are determined by the conditions existing in the particular hydrocarbon processing system. It is to be understood that the invention is not to be limited by the dosage of the vegetable oil.

The treatments of the instant invention can be applied to the hydrocarbon processing system along with other hydrocarbon treatment programs. Representative additives include antifoulants and corrosion inhibitors.

In order to more clearly illustrate this invention, the data set forth below was developed. The following examples are included as being illustrations of the invention and should not be construed as limiting the scope thereof.

EXAMPLES

The vegetable oils of the instant invention were evaluated for their foam control ability in the high temperature defoamer test. The test procedure is described below.

A 500 ml borosilicate glass cylinder is charged with 250 ml coker feed. The sample is sparged slowly (100-200 ml/min) with nitrogen using a submerged borosilicate tube with a fine pore fritted gas diffuser.

The sample is then heated with an electric mantle to the temperature of the unit. (Typically 700°-900° F. for a coker drum). As the sample approaches the temperature of the unit (within 50° F. of 800° F.), the nitrogen flow is increased to bring the foam height above the 500 ml mark.

The defoamer is added as a dilute solution (about 1% active) from a weighed syringe at a rate which maintains the foam height at the 500 ml mark. The time of first injection is recorded. After timing for 2 to 60 minutes, the syringe is reweighed, and the usage recorded. The longer the duration of the test, the more accurate the result is.

The distillate collected can be analyzed for chemical carryover if desired. The residue can be allowed to completely coke and the coke analyzed for quality if desired. The results of this testing are presented in Table I.

TABLE I

| High Temperature Defoamer Test Texas Refinery Coker Feed | |
|---|---|
| Treatment Agent | Usage (mg active/min) |
| A | 0.035 |
| B | 0.48 |
| C | 0.38 |
| D | 0.58 |
| E | 0.39 |

A is dimethylpolysiloxane in aromatic solvent
B is polyisobutylene in aromatic solvent
C is a sulfonated hydrocarbon compound in aromatic solvent
D is Jojoba oil, "refined" grade
E is Jojoba oil, "pure" grade These results indicate that the vegetable oils of the instant invention prove effective at controlling foam in hydrocarbon systems.

In accordance with the patent statutes, the best mode of practicing the invention has been set forth. However, it will be apparent to those skilled in the art that many other modifications can be made without departing from the invention herein disclosed and described, the scope of the invention being limited only by the scope of the attached claims.

Having thus described the invention, what I claim is:

1. A method for controlling foam in hydrocarbon fluids at a temperature from about 300° F. to about 1000° F. during processing comprising adding an effective amount of a jojoba oil.

2. The method as claimed in claim 1 wherein said jojoba oil is added to said hydrocarbon in an amount of 10 parts to about 1000 parts per million parts hydrocarbon.

3. The method as claimed in claim 1 wherein said hydrocarbon is coker fluid.

4. The method as claimed in claim 1 wherein said hydrocarbon is crude oil.

5. The method as claimed in claim 1 wherein said jojoba oil is added to said hydrocarbon in a suitable solvent.

6. The method as claimed in claim 5 wherein said solvent is a hydrocarbon fluid.

* * * * *